(12) United States Patent
Kang et al.

(10) Patent No.: US 7,890,146 B2
(45) Date of Patent: Feb. 15, 2011

(54) METHOD AND SYSTEM FOR PROVIDING SELECTED SERVICE BY DISPLAYING NUMBERS AND STRINGS CORRESPONDING TO INPUTTED BUTTONS

(75) Inventors: Moon-Soon Kang, Seongnam-si (KR); Jin-Ho Park, Seoul (KR); Eun-Hui Moon, Suwon-si (KR)

(73) Assignee: KT Corporation, Seoul (KR)

( * ) Notice: Subject to any disclaimer, the term of this patent is extended or adjusted under 35 U.S.C. 154(b) by 937 days.

(21) Appl. No.: 11/803,109

(22) Filed: May 11, 2007

(65) Prior Publication Data

US 2007/0266013 A1 Nov. 15, 2007

Related U.S. Application Data

(63) Continuation of application No. PCT/KR2005/003796, filed on Nov. 10, 2005.

(30) Foreign Application Priority Data

Nov. 12, 2004 (KR) .................. 10-2004-0092405

(51) Int. Cl.
*H04M 1/00* (2006.01)
(52) U.S. Cl. ................. 455/566; 455/412.1; 455/414.1; 455/414.4; 455/567
(58) Field of Classification Search .............. 455/414.1, 455/414.4, 550.1
See application file for complete search history.

(56) References Cited

U.S. PATENT DOCUMENTS 6,081,584 A * 6/2000 Hidaka ................... 379/93.05

| | | | |
|---|---|---|---|
| 6,891,811 B1 | 5/2005 | Smith et al. | |
| 6,909,702 B2 | 6/2005 | Leung et al. | |
| 2003/0177198 A1* | 9/2003 | Yabe et al. ................... 709/217 | |

FOREIGN PATENT DOCUMENTS

| | | |
|---|---|---|
| JP | 1998-124422 | 5/1998 |
| JP | 1998-207908 | 8/1998 |
| JP | 2001-243148 | 9/2001 |
| JP | 2002-063196 | 2/2002 |
| JP | 2002-207559 | 7/2002 |
| JP | 2002-300261 | 10/2002 |
| KR | 10-2002-0082509 | 10/2002 |
| KR | 10-2002-0082509 A | 10/2002 |
| WO | WO 03/069459 | 8/2003 |

OTHER PUBLICATIONS

International Search Report for International Application No. PCT/KR2005/003796 dated Feb. 28, 2006 by Korean Intellectual Property Office.

Office Action for Japanese Patent Application No. 2007-541099 dated Feb. 23, 2010 by Japanese Patent Office.

* cited by examiner

*Primary Examiner*—Dai A Phuong
(74) *Attorney, Agent, or Firm*—Knobbe Martens Olson & Bear LLP

(57) ABSTRACT

A method and system for providing a mobile service is disclosed. In one embodiment, both of numbers and characters, corresponding to numeric buttons entered by a user, are displayed on two separate display regions, respectively. According to one embodiment, a voice call or wireless Internet service being selected by the user can be quickly performed. Furthermore, it does not need to learn how to use, it is easy for a user to access information quickly, and to enhance the user convenience because a user can select one of various services via one button push.

18 Claims, 11 Drawing Sheets

METHOD AND SYSTEM FOR PROVIDING SELECTED SERVICE BY DISPLAYING NUMBERS AND STRINGS CORRESPONDING TO INPUTTED BUTTONS

RELATED APPLICATIONS

This application is a continuation application, and claims the benefit under 35 U.S.C. §§120 and 365 of PCT Application No. PCT/KR2005/003796, filed on Nov. 10, 2005 and, which is hereby incorporated by reference.

BACKGROUND OF THE INVENTION

1. Field of the Invention

The present invention relates to method and system for providing a mobile service, especially, by inputting both of numbers and characters corresponding to buttons that a user enters, for quickly providing a voice call or wireless Internet service being selected by the user.

2. Description of the Related Technology

A user who wants to make a phone (voice) call enters a phone number by pushing numeric buttons on a mobile terminal and then a "SEND" button. Also, a user who wants to use wireless Internet service accesses the wireless Internet through another procedure different and independent from that of the phone call. Hereinafter, the wireless Internet access procedure by using a conventional mobile terminal will briefly be described.

Now, the most common way of accessing the wireless Internet through the mobile terminal is to push a function key such as a "tot key" on the mobile terminal. The user pushes the hot key being indicated as, for example, MAGICn, EZi, NATE in Korea, T@ in United States, and i in China, and accesses each wireless portal site operated by each mobile service provider. By this conventional wireless Internet access procedure, it is convenient to access the wireless portal site (i.e., mobile service provider's portal site). However, it is inconvenient to access other independent portal sites or a lower directory of the portal site rather than the mobile service provider's portal site.

So, in order to access the desired wireless Internet site or information, the user must access the wireless Internet and then search the desired service menu, or input a domain name or IP address by using numeric keypads. Thus, the procedure for accessing the desired wireless site or information is more difficult and complicate than accessing the mobile service provider's wireless portal site. Another way of accessing to the wireless Internet or information is using a URL callback SMS.

A uniform resource locator (URL) callback, the representative wireless Internet access method, is that short message service (SMS) includes the URL of a wireless Internet site and/or webpage and the mobile terminal accesses directly the site on pushing a SEND button. When the site transmits a URL callback message, the user can register the received URL on a favorite list and access the site by using the favorite list.

But, the aforementioned methods still have shortcomings that basically connection information must be provided from an external device and the mobile terminal can only use the received connection information after storing thereon.

Thus, according to the wireless Internet service access of the aforementioned methods, it is difficult and complicate for the user to use, and it costs much time and money.

Also, according to the wireless Internet service access of the aforementioned methods, it is complicate for the user to access desired information, and it requires a great deal of time.

SUMMARY OF CERTAIN INVENTIVE ASPECTS

One aspect of the present invention provides a method and system for providing the selected service by dual input of number string and character string, which display number and character, both assigned to one numeric button, at the same time and allow the user to select one of number string and character string by pushing a function button corresponding to the number string or the character string so that user convenience will improve.

Another aspect of the present invention provides method and system for providing the selected service by dual input of number string and character string, which can recognize URL or service type of the desired site by using the transmitted character string so that access to information is rapidly accomplished.

Still another aspect of the present invention provides method and system for providing the selected service by dual input of number string and character string, which can eliminate the need to learn how to use the service.

Still another aspect of the present invention provides method and system for providing the selected service by dual input of number string and character string, which can induce the user to access wireless Internet through the easier wireless Internet access method and revitalize wireless Internet service and electronic commerce through frequent accesses to wireless Internet.

Still another aspect of the present invention a method for providing an Internet access service on a user terminal being coupled to a network through an Internet service access apparatus in a mobile communication system, and also provided a system, an apparatus and a computer-readable medium, which enables the operation of the method, comprising: (a) receiving an input signal for a numeric button, (b) interpreting the input signal as a number and a character, (c) displaying the number and the character respectively on a number string display region and a character string display region, repeating the (a) through (c) till there is any input signal for a function button, on receiving the input signal for the function button, determining if the function button is associated with the number string display region or the character string display region, and if the function button is associated with the character string display region, transmitting an Internet access request including the character string displayed on the character string display region to the Internet service access apparatus.

The method for providing an Internet access service may further comprise transmitting a voice call request including the number string displayed on the number string display region to the mobile communication system if the function button is associated with the number string display region.

In the method for providing an Internet access service, the character string display region is divided into N(>=2) character string display regions for displaying character of plural languages corresponding to the numeric button and the divided character string display regions are associated with plural function buttons respectively.

The method for providing an Internet access service may further comprise: receiving an input signal of a conversion button for converting language of the character string on the character string display region from a first language into a second language, on receiving the input signal of the conversion button, converting the language of the character string on the character string display region from the first language into the second language, and displaying the character string in the second language on the character string display region.

In the method for providing an Internet access service, the transmitting an Internet access request including the character string displayed on the character string display region to the Internet service access apparatus comprises: performing a spelling check on the character string, if there is an incorrect spelling in the character string, converting the language of the character string into one of languages that the user terminal can support, generating the Internet access request including the converted character string, and transmitting the Internet access request to the Internet service access apparatus.

In the method of claim for providing an Internet access service, if the character string in the Internet access request comprises more than one character, the Internet service access apparatus transmits one of a domain address corresponding to the character string and a web page corresponding to the domain address to the user terminal.

In the method for providing an Internet access service, if the character string in the Internet access request comprises a service type and a keyword that are distinguished by a predetermined separator, the Internet service access apparatus transmits to the user terminal a search list that is generated by using the service type and the keyword.

Still another aspect of the present invention provides a method being performed by an Internet service access apparatus in a mobile communication system for providing a wireless Internet access service corresponding to an Internet access request from a user terminal being coupled through a network, and also provided a system, an apparatus and a computer-readable medium, which enables the operation of the method, comprising: receiving an Internet access request including a character string from the user terminal, extracting the character string from the Internet access request, determining whether or not the extracted character string consists of more than one character, if the character string consists of more than one character, transmitting a URL request including the character string to a character string DNS server and receiving an URL corresponding to the character string from the character string DNS server, and transmitting the URL corresponding to the character string to the user terminal. Wherein the user terminal displays a number string and the character string corresponding to numeric buttons that the user inputs on a number string display region and a character string display region respectively, and if a function button corresponding to the character string display region is inputted, transmits the Internet access request to the Internet service access apparatus.

The method for providing an Internet access service may further comprise: if the character string in the Internet access request comprises a service type and a keyword that are distinguished by a predetermined separator, transmitting the URL request corresponding to the service type to the character string DNS server and receiving the URL corresponding to the service type from the character string DNS server, transmitting a search list generation request including the URL and the keyword to a search server and receiving a search list that is generated by using search result from more than one information server corresponding to the URL, and transmitting the search list to the user terminal.

In the method for providing an Internet access service, the service type is any word that can be used to represent a category such as reservation, search, news, stock, ticket, actor/actress and game.

In the method for providing an Internet access service, in order to extract the URL corresponding to the character string, the character string DNS server may extract the character string from the URL request, and extract the URL corresponding to the character string by using more than one character string and more than one URL that were stored in advance and match information of the stored character string and the stored URL.

The method for providing an Internet access service may further comprise: receiving location information of the user terminal from one of the user terminal and a location detection server included in the mobile communication system, and transmitting the location information to one of the character string DNS server and the search server. Wherein the character string DNS server transmits URL associated only with the location information or the search server generates the search list by using the search result associated only with the location information.

In the method for providing an Internet access service, the URL to be transmitted to the user terminal is transmitted with being included in a web page corresponding to the URL.

Still another aspect of the present invention provides a user terminal, coupled to an Internet service access apparatus in a mobile communication system through a network, for providing an Internet access service, comprising: a display, a keypad with more than one numeric button and more than one function button, a button recognition processor for recognizing a number and a character that are associated with the numeric button, a display controller for displaying the number and the character in the form of number string and character string respectively on a number string display region and a character string display region, wherein both regions are on the display and independent from each other, a signal generator for determining that if one of function button is inputted, the function button is associated with the character string display region, and for generating an Internet access request including the character string on the character string display region if the inputted function button is associated with the character string display region, and a transceiver for transmitting the Internet access request to the Internet service access apparatus.

The user terminal may further comprise: a conversion button for generating a conversion signal, and an input character string converter for converting the first language of the character string on the character string display region into the second language when receiving the conversion signal.

Yet another aspect of the present invention provides an Internet service access apparatus, being coupled to a user terminal through a network, for providing Internet access service corresponding to an Internet access request from the user terminal, comprising: a proxy server, receiving the Internet access request including a character string from the user terminal, extracting the character string from the Internet access request, and if the character string consists of more than one character only, transmitting URL corresponding to the character string to the user terminal, and a character string DNS server, being coupled to the proxy server through the network and providing URL corresponding to the character string by using information stored in advance, wherein information comprises more than one character string and more than one URL that were stored in advance and match information of the stored character string and the stored URL. Wherein the user terminal displays a number string and the character string corresponding to numeric buttons that the user inputs on a number string display region and a character string display region respectively, and if a function button corresponding to the character string display region is inputted, transmits the Internet access request to the Internet service access apparatus. The proxy server may add an additional identifier onto the character string for identifying the connection from the user terminal.

Also, if the character string comprises a service type and a keyword that are distinguished by a predetermined separator, the proxy server transmits an URL request corresponding to the service type to the character string DNS server, receives the URL corresponding to the service type from the character string DNS server, transmits a search list generation request including the URL and the keyword to a search server, receives a search list that is generated by using search result from more than one information server corresponding to the URL, and transmits the search list to the user terminal.

DETAILED DESCRIPTION OF CERTAIN INVENTIVE EMBODIMENTS

Hereinafter, embodiments of the present invention will be described with respect to accompanying drawings. In description, reference number indicating the same component will be used as same regardless of the number of drawing.

Figure 1:
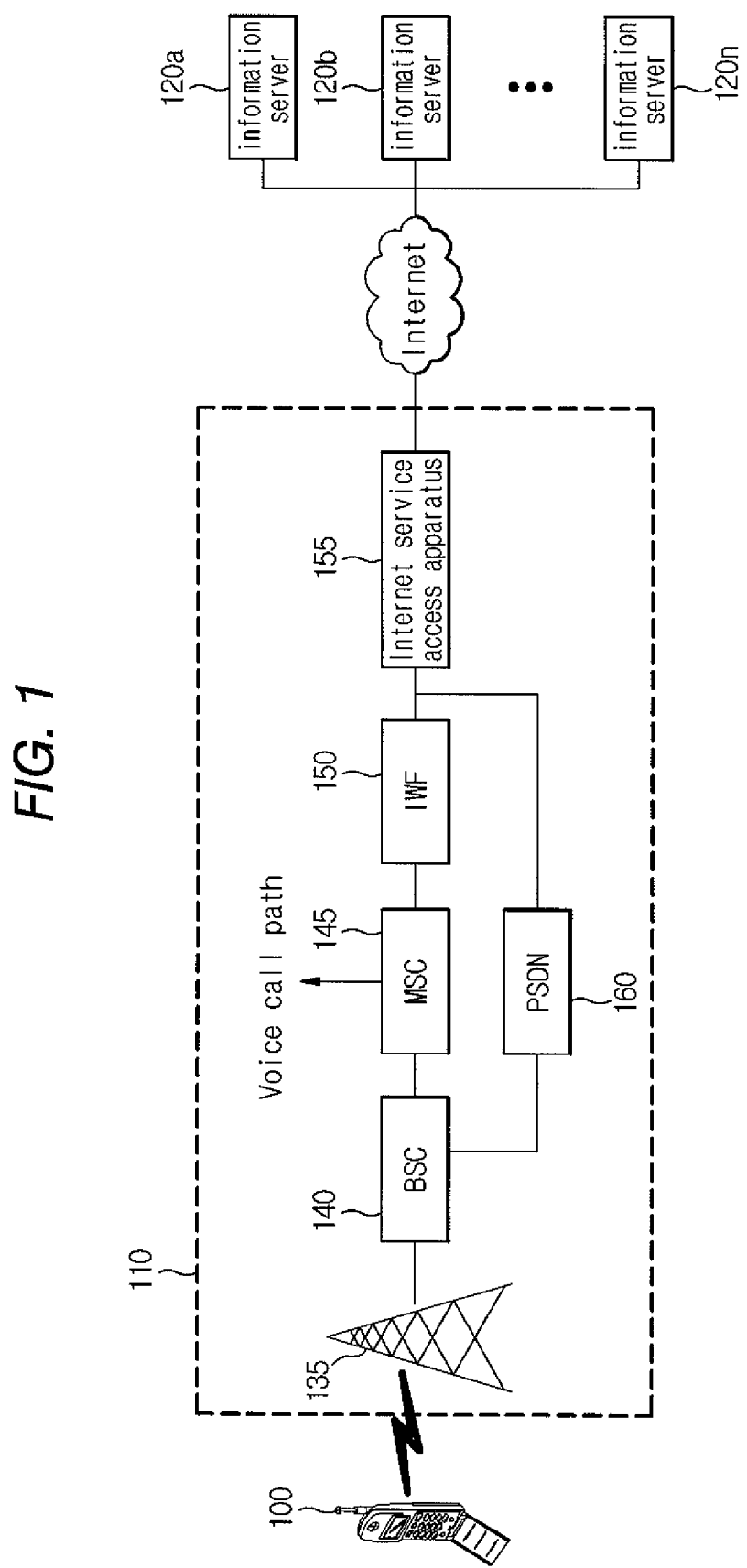
FIG. 1 shows a system for performing a method for selecting a service through dual input of number and character string.

FIG. 1 shows a system for performing a method for selecting a service through dual input of number string and character string.

Referring to FIG. 1, the system for performing a method for selecting a service through dual input of number string and character string comprises a user terminal 100, a mobile communication system 110, and plural information servers 120a, 120b, . . . 120n (hereinafter, '120')

The user terminal 100 can access to the mobile communication system 110 through a network to use a wireless Internet service being provided from the mobile communication system 110. BTS 135 receives signals being originated from the user terminal, and then sends the signals to MSC 145 through BSC 140. The user terminal is, as shown in FIG. 1, one of mobile terminal, PDA (Personal Digital Assistant), and notebook computer. The configuration of operation of the user terminal 100 will be described in detail with referring to the accompanying drawings.

The mobile communication system 110 comprises BTS 135, BSC 140, MSC 145, IWF (InterWorking Function) 150, Internet service access apparatus 155, and PDSN (Packet Data Serving Node) 160. Although it is now shown in FIG. 1, it is apparent that the mobile communication system 110 will further comprise VLR (Visitor Location Register) and HLR (Home Location Register).

MSC 145 establishes a voice call path if the originating signal from the user terminal 100 is for voice communication, or transfers the originating signal to IWF 150 if the originating signal is for wireless Internet access. It is apparent that the originating signals for voice communication and wireless Internet access will have different format distinguishable from each other.

IWF 150 interconnects a voice network with a data network, namely, works as a gateway for interfacing two networks having different protocols. PDSN 160 provides 3G packet data network service, so the user terminal 100 can access to the Internet service access apparatus 155 through PDSN 160.

Internet service access apparatus 155 extracts character string from the originating signals for wireless Internet access being transferred from IWF 150 or PDSN 160, extracts URL corresponding to the character string (e.g., flower delivery), and enables the user terminal 100 to use the service from the corresponding information server 120. Also, if the extracted character string (e.g., search*flower delivery) is for searching any information server or web site, the Internet service access apparatus 155 can provide a search list related to the character string (e.g., 1-800-flowers.com, Flowers Online, etc.) to the user terminal 100.

Figure 2:
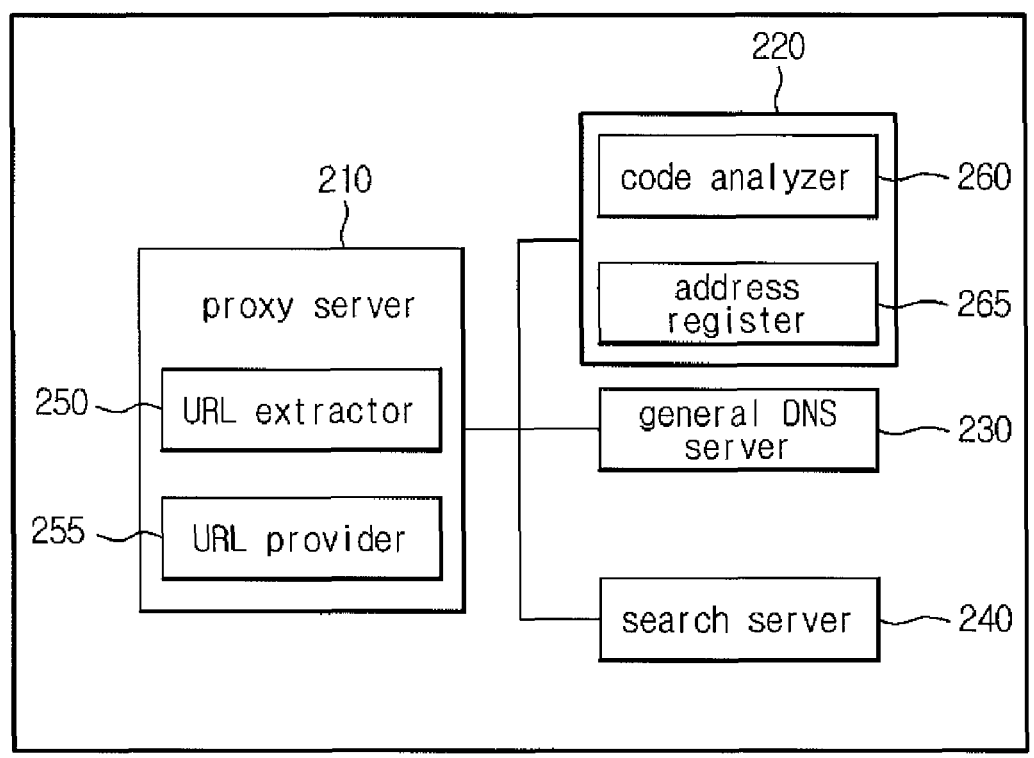
FIG. 2 is a block diagram of an Internet service access apparatus according to one embodiment of the present invention.

FIG. 2 is a block diagram of Internet service access apparatus according to one embodiment of the present invention. Of course, each function can be realized as separate and independent devices, and the function of search server 240 can be included in proxy server 210.

In one embodiment, as shown in FIG. 2, the Internet service access apparatus 155 comprises proxy server 210, character string DNS server 220, general DNS server 230 and search server 240.

Proxy server 210 extracts connection information (i.e., character string, separator, or identifier, wherein the character string can comprise separator or identifier in a broad sense) from the originating signal (hereinafter, "Internet access request signal") being transferred from the user terminal 100, and transfers detailed URL corresponding to connection information to the user terminal 100. If received connection information includes domain name or URL according to the prior art, proxy server 210 is configured to access to general DNS server 230. And, if the received Internet access request signal includes the character string that the general DNS server 230 cannot recognize, proxy server 210 is configured to access to character string DNS server 220 or search server 240 to provide the Internet access service. As the Internet access scheme using general DNS server 230 is well known to those who skilled in the art, the detailed description will be omitted. Proxy server 210 may include URL extractor 250 and URL provider 255. URL provider 255 can provide Internet access service as follows: to send URL of site corresponding to connection information to the user terminal 100 to access by using the URL; and to call the web page corresponding to the URL and send it to the user terminal 100, etc. Namely, the Internet access service can be configured that proxy server 210 extracts detailed URL and transfers it to the user terminal 100 to access to the detailed URL, or calls page corresponding to the detailed URL and provides it to the user terminal 100 directly. Since the provided page information includes corresponding URL, hereinafter being provided to the user terminal 100 from the proxy server 210 will be called as URL regardless of Internet access scheme.

URL extractor 250 extracts detailed URL corresponding to connection information, and provides the detailed URL according to the predetermined method by analyzing connection information (i.e., character string). URL extractor 250 determines if connection information is for accessing a certain site or a search list request by using the structure of connection information, and can then provide Internet access service according to the determination. Table 1 shows how URL extractor 250 determines if connection information is a site access request signal or search list request signal or step-by-step execution request signal by analyzing the structure of connection information.

TABLE 1

| Type | Structure | Operation |
|---|---|---|
| Site access request signal | Composed of character string only such as 'Idol star picture', 'actor/actress' | To extract URL corresponding to the character string, send request to character string DNS server or general DNS server, or to extract search list corresponding to the character string, send request to search server |
| Site access request signal | Composed of separator and plural character string such as 'search*flower delivery', 'ticket*movie' | Recognize the preceding character string as service type, and send request to search server to extract search list corresponding to the service type and following character string |
| Step-by-step execution request signal | Composed of separator and one character string such as '*Chinese restaurant' | Firstly operate by regarding it as site access request signal, then operate by regarding it as search list request signal if there is no corresponding URL |

URL extractor 250 determines if connection information is the site access request signal or the search list request signal or the step-by-step execution request signal by using the structure of connection information. At this, it is apparent that connection information further comprises an additional identifier (e.g., ! or #) for indicating the site access request signal or the search list request signal. But, hereinafter we will mainly describe the case that the type of connection information is determined only by its structure and connection information is site access request signal or search list request signal.

For example, if the user tries to access to "KTFreetel" the user terminal 100 converts the user-input character string "KTFreetel" into the predetermined transmission format data that is transferable via network and recognizable to the mobile communication system 110. The character string in the transmission format data may be converted into http://KTFreetel, *KTFreetel, http://*KTFreetel, etc. Proxy server 210 recognizes the connection information as the site access request signal by analyzing the structure of connection information included in the transmission format data, and transfers it to the character string DNS server 220. The character string DNS server 220 extracts domain address (e.g., http://www.ktf.com) corresponding to connection information and provides it to the proxy server 210. Proxy server 210 transfers the received domain address to the user terminal 100 so that the user terminal 100 accesses to web page, or transfers the web page corresponding to the domain address to the user terminal 100.

If connection information included in the transmission format data is "search*flower delivery", proxy server 210 receives domain address of search site from the character string DNS server 220 and transfers a search request to the search server 240. The search server 240 searches site information to send the search list to the proxy server 210, and the proxy server 210 transfers the received search list to the user terminal 100. Of course, if the domain address from the character string DNS server 220 is close to the search list (e.g., connection information is movie*ticket and the received ones are domain addresses of sites selling ticket), the received domain addresses are transferred to the user terminal 100. In addition, if the search list includes one domain address or the site for the service is predetermined, it is then possible to access to the site directly.

If connection information received from the proxy server 210 is the site access request signal, the character string DNS server 420 extracts domain address (i.e., URL) corresponding to the connection information and provides it to the proxy server 210. And, if connection information received from the proxy server 210 is the search list request signal, the character string DNS server 420 extracts domain address corresponding to the service type and/or keyword and provides it to the proxy server 210. For example, if the search list request signal is "search*flower delivery" the character string DNS server 420 extracts domain address of search sites (e.g., www.yahoo.co.kr) and provides it to the proxy server 210. As shown in FIG. 2, the character string DNS server 420 may comprise code analyzer 260 and address register 265, and further comprise storage for storing domain addresses. The code analyzer 260 is configured to extract URL from the received character string by referring to the address register 265. The address register 265 generates, stores and manages connection information-domain address mapping table.

And, although it is not shown in FIG. 1, the mobile communication system 110 can further comprise a location detection server for providing location-based service (LBS). The location detection server recognizes location information of user terminal by using location data of user terminal 100 being received by BTS or GPS location data from the user terminal 100, and transfers it to an Internet service access apparatus 155. In this case, the Internet service access apparatus 155 can provide LBS corresponding to the character string included in the originating signal from the user terminal 100. For example, if the character string included in the originating signal is "ticket*movie*island (title of movie)", the Internet service access apparatus 155 provides a ticket service, and then a search list including at least one web site that provides on-line ticket service for at least one theater, which locates on the current location of user, showing the movie "island" can be provided to the user terminal 100. Of course, if there is only one site that provides the service or the on-line ticket site is predetermined, then it is possible to access to the site directly. The geographical range corresponding to the location of user terminal 100 may be cities and provinces in the LBS.

The information server 120 provides various information (e.g., document, multimedia data, etc.) through a browser installed on the user terminal 100.

Figure 3:
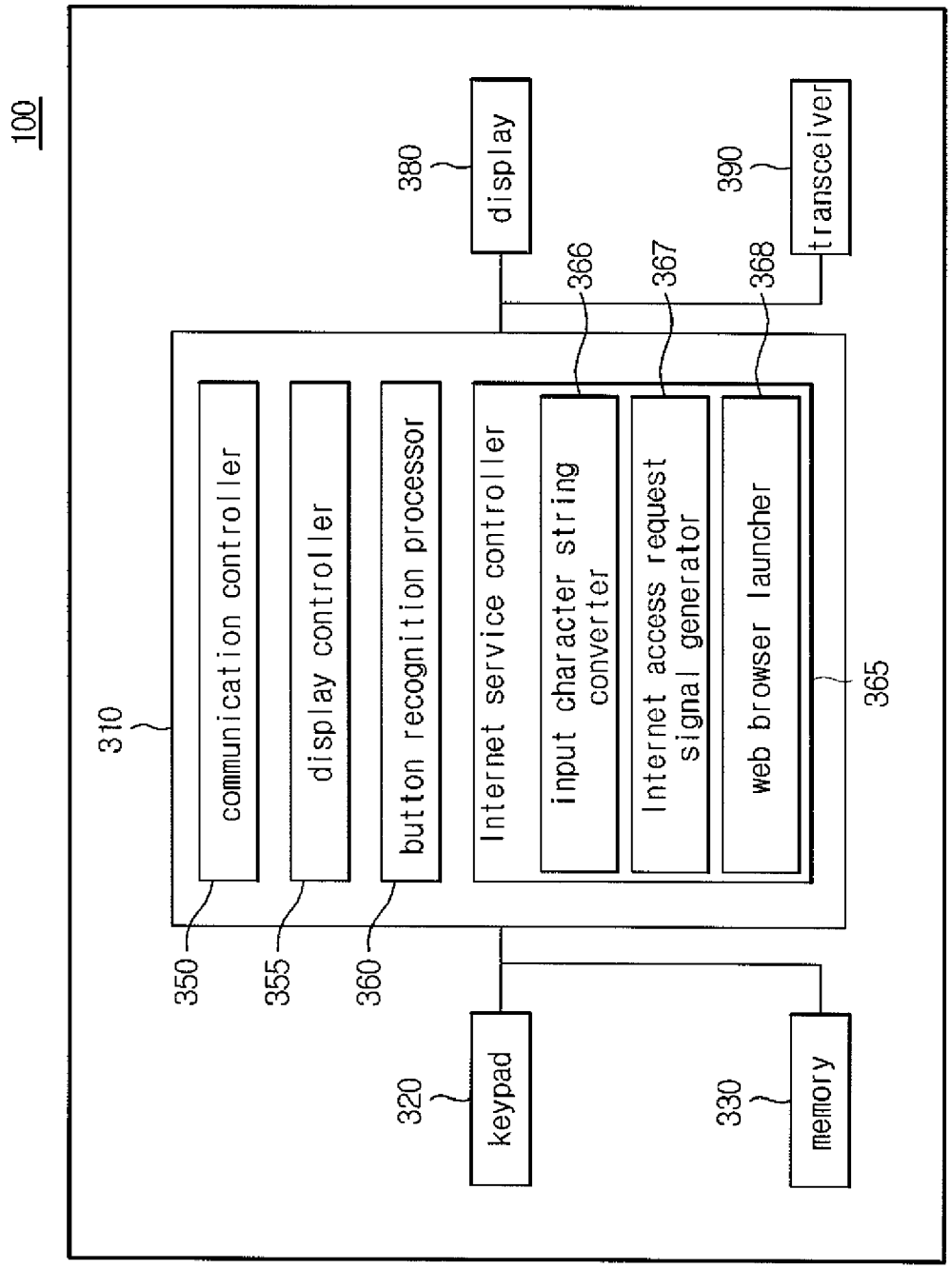
FIG. 3 is a block diagram of a user terminal according to one embodiment of the present invention.
Figure 4:
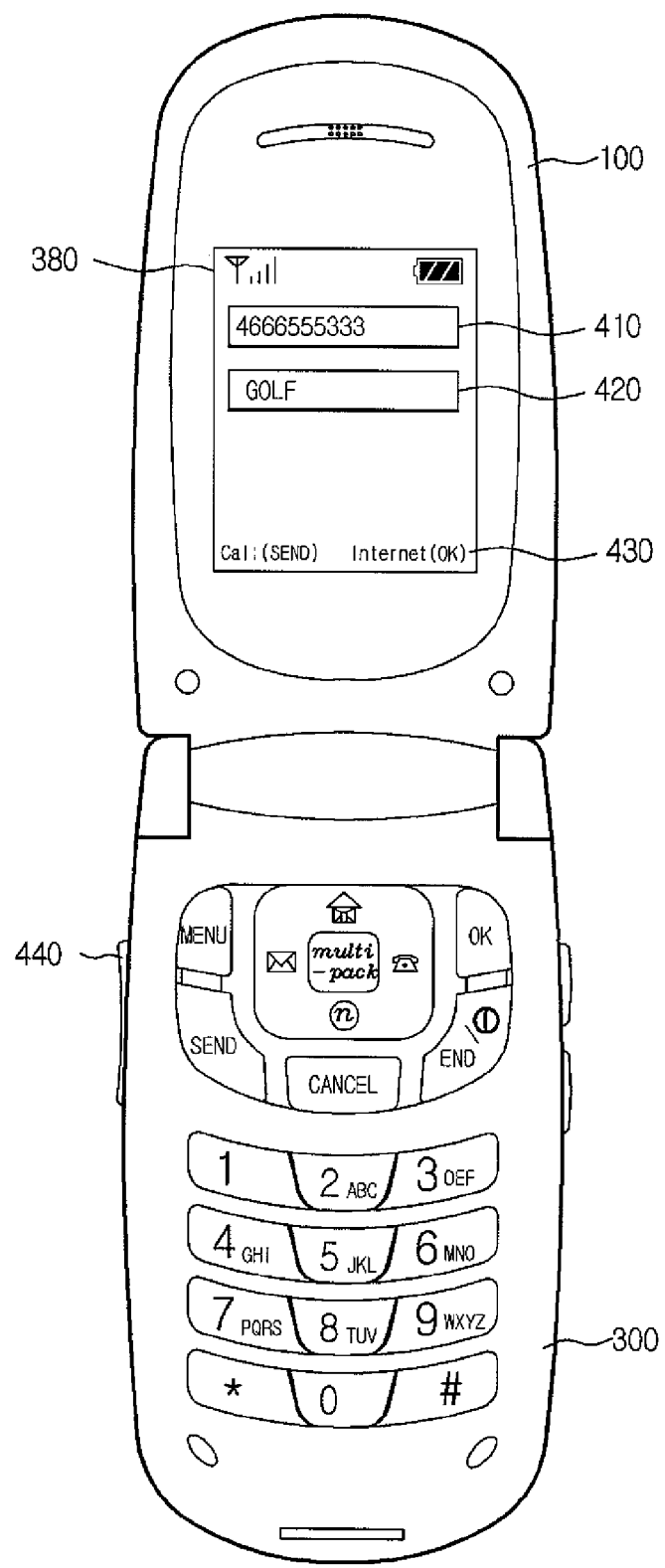
FIG. 4 illustrates the method of displaying input information on the user terminal according to one embodiment of the present invention.

FIG. 3 is a block diagram of the user terminal according to one embodiment of the present invention and FIG. 4 illustrates the method of displaying input information on the user terminal according to one embodiment of the present invention.

Referring to FIG. 3, the user terminal 100 comprises controller 310, keypad 320, memory 330, display 380 and transceiver 390.

The controller 310 may comprise communication controller 350, display controller 355, button recognition processor 360, and Internet service controller 365.

The display controller 355, as shown in FIG. 4, divides display 380 into plural regions (e.g., the first region 410 for displaying number string corresponding to the inputted numeric button, the second region 420 for displaying Korean or Alphabet corresponding to the inputted numeric button, function button connection information display region 430 for requesting service by using information displayed on each region, etc), and displays number string and character string on each region, both are being recognized by the key recognition processor 360. It is apparent that the display controller 355 can divide the displays 380 into plural regions (e.g., number string display region, Korean display region, Alphabet display region, function button connection information display region, etc) according to the kind of information to be displayed, however, hereinafter we will describe the case of dividing the display 380 into three regions mainly.

The button recognition processor 360 recognizes number and character, which are inputted by numeric button(s) of the keypad 320, and sends them to the display controller 355. For example, if the inputted numeric button is number "6", the button recognition processor 360 recognizes that the inputted numeric button corresponds to Korean "ㄷ" and Alphabet "m" and then transmits the result of recognition to the display controller 355.

The Internet service controller 365 may comprise input character string converter 366, Internet access request signal generator 367, and web browser launcher 368. The Internet service controller 365 starts to operate when the Internet access request is inputted by selecting the function button (e.g., "OK" button) associated with the second region (420 in FIG. 4) after several numeric buttons are selected.

The input character string converter 365 converts the character string displayed on the second region 420 when the predetermined function button (hereinafter, conversion button) for converting character string is inputted. For example, if the user successively inputs numeric buttons corresponding to "6", "2", "3" respectively, "623" is displayed on the first region 410, "ㅁㅏㄷ" is displayed on the second region 420 when the input method for Korean is 'Cheon-Ji-In'. But, if the user wants to display Alphabet on the second region 420, the user can change the language to be displayed on the second region from Korean to English by pushing the conversion button (e.g., # button, volume button (440 FIG. 4)) for generating a conversion signal. After pushing conversion button (i.e., generation of the conversion signal), "mad" will be displayed on the second region. Also, if the user inputs Internet access request by selecting the function button corresponding to the character string displayed on the second region 420, the input character string converter 365 can perform a spelling check for the character string displayed on the second region 420, and convert the character string automatically into other languages if it is grammatically incorrect. For example, if the character string on the second region 420 is "ㅅㅍㄱㅂ",the input character string converter 365 can convert the character string into "trip". Of course, if the auto-converted character string is also grammatically incorrect, an error message or a dialog box for transmission confirm can be displayed on the display 380. The mechanism of converting one language into another language is called "automata" and this mechanism is well-known in the art, so detailed description will be omitted here.

When the Internet access request is inputted by using character string on the second region 420 and the corresponding function button, the Internet access request signal generator 367 generates the predetermined transmission format data by using the character string. The generated transmission format data is transferred to the mobile communication system 110 via the transceiver 390.

The web browser launcher 368 executes a web browser stored in the memory 330 when the user inputs the Internet access request.

FIG. 4 shows the user terminal displaying input information according to one embodiment of the present invention. The display 380 of the user terminal as shown in FIG. 4 is divided into three regions, and each region displays the number string corresponding to the inputted numeric buttons, the character string corresponding to the inputted numeric buttons, and function button connection information (e.g., the first region-SEND button, the second region-OK button) for requesting service by using information displayed on each region, respectively. Of course, as described above, it is possible to increase the number of regions according to the kinds of information to be displayed on the display 380, and information in one language can be converted into another language by pushing any conversion button (e.g., # button, volume button 440).

Figure 5:
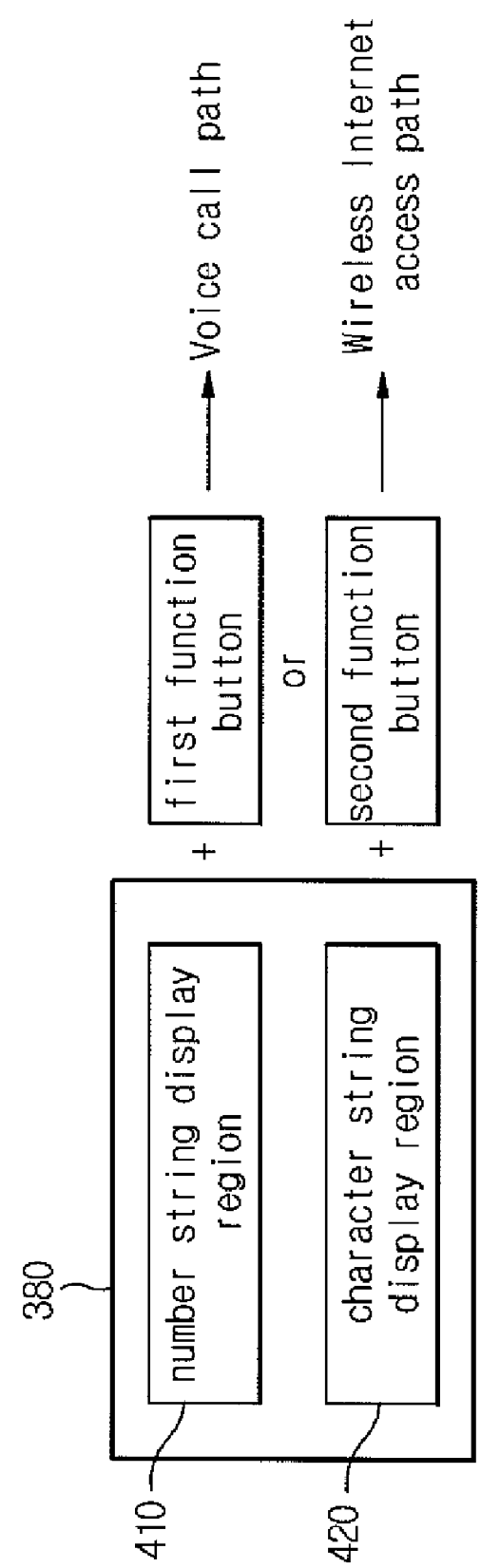
FIG. 5 illustrates the process of performing the selected service by using display information and function button according to one embodiment of the present invention.

FIG. 5 illustrates the process of performing the selected service by using display information and function button according to one embodiment of the present invention. The display 380 of the user terminal 100 is divided into plural regions displaying different information, and each function button is preset to each region. So, information to be transferred to the mobile communication system 110 is dependent on which function button the user selects and the mobile communication system 110 provides the service corresponding to the transferred information to the user terminal 100. That is, as show in FIG. 5, the first region (i.e., number string display region) is configured to correspond to the first function button (e.g., SEND button) so that the user terminal 100 transfers request information for voice call to the mobile communication system 110 when the user selects the first function button. Also, the second region (i.e., character string display region) is configured to correspond to the second function button (e.g., OK button) so that the user terminal 100 transfers request information for wireless Internet access to the mobile communication system 110 when the user selects the second function button.

Figure 6:
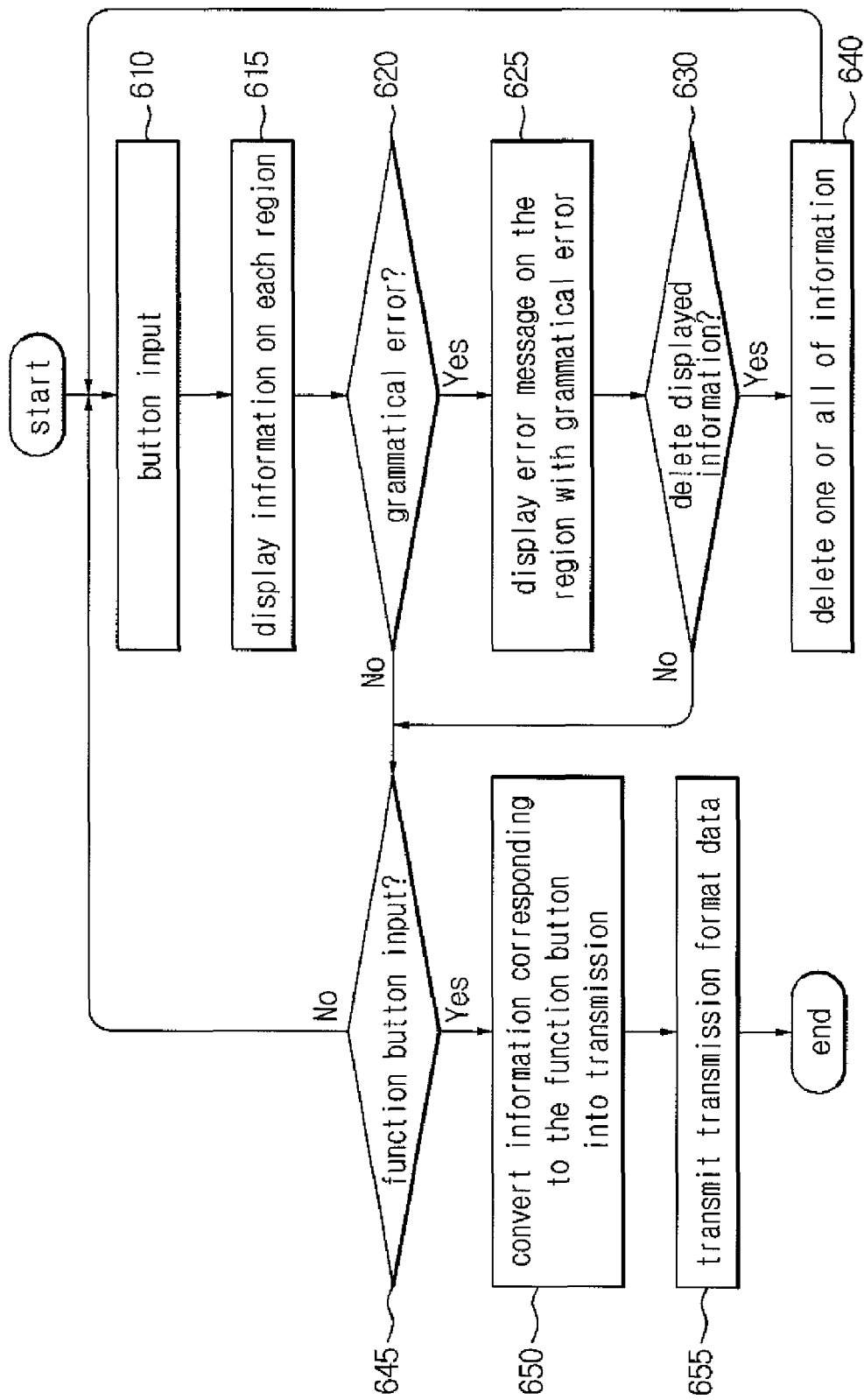
FIG. 6 is a flowchart of a method for service select request through the dual input of number string and character string according to one embodiment of the present invention.

FIG. 6 is a flowchart of method for service select request through the dual input of number string and character string according to one embodiment of the present invention.

Referring to FIG. 6, the user terminal 100 receives input of numeric button(s) from the user at step 610, and displays number string and character string corresponding to the inputted numeric buttons on each separated region at step 615.

The user terminal 100 checks the grammatical error for the character string on the character string display region 420 at step 620. For example, one Korean letter consists of one initial consonant and one vowel such as "가나다", or one initial consonant, one vowel and more than one final consonant such as "꿈". Thus, although Korean is displayed on the character display region, however, if the character string consists of consonants or vowels only, it can be recognized as grammatically incorrect.

If there is a grammatical error, an error message (e.g., disabled) is displayed on the corresponding region at step 625. Of course, it is also possible that the original language of character string is automatically converted into another language (e.g., English) rather than displaying error message.

Then, the user terminal 100 determines whether or not the user cancels or deletes one or more characters (i.e., 'cancel' button pushed) at step 630.

When character delete command is inputted, the user terminal 100 deletes the final-inputted number and character, and then displays the rest on each region at step 640. And, the mobile terminal 100 returns to step 610.

But, if the character delete command is not inputted or there is no grammatical error according to the determination of step 620, then the mobile terminal 100 proceeds to step 645.

The user terminal 100 determines whether or not the user selects any one of function buttons at step 645. If no function button is selected, the user terminal returns to the step 610.

But, if any one of function buttons is selected, the user terminal 100 converts display information corresponding to the selected function button into the predetermined transmission data format at step 650, and transfers the transmission format data to the mobile communication system 110. As being assumed above, when the function buttons corresponding to the number string display region and the character display region are SEND button and OK button, respectively, the user terminal 100 generates transmission format data (i.e., voice call request) including number string and transfers it to the mobile communication system 110 if the selected function button is SEND button, and the user terminal 100 generates transmission format data (i.e., wireless Internet request) including character string and transfers it to the mobile communication system 110 if the selected function button is OK button. For example, when the user pushes numeric buttons "4", "6", "6", "6", "5", "5", "5", "3", "3", "3" successively, "4666555333" is displayed on the number string display region, "GOLF" is displayed on the character display region. After that, if the user selects SEND button, the mobile terminal 100 tries to make a voice call by using the number string, and if the user selects OK button, the mobile terminal 100 tries to access wireless Internet by using the character string.

Figure 7:
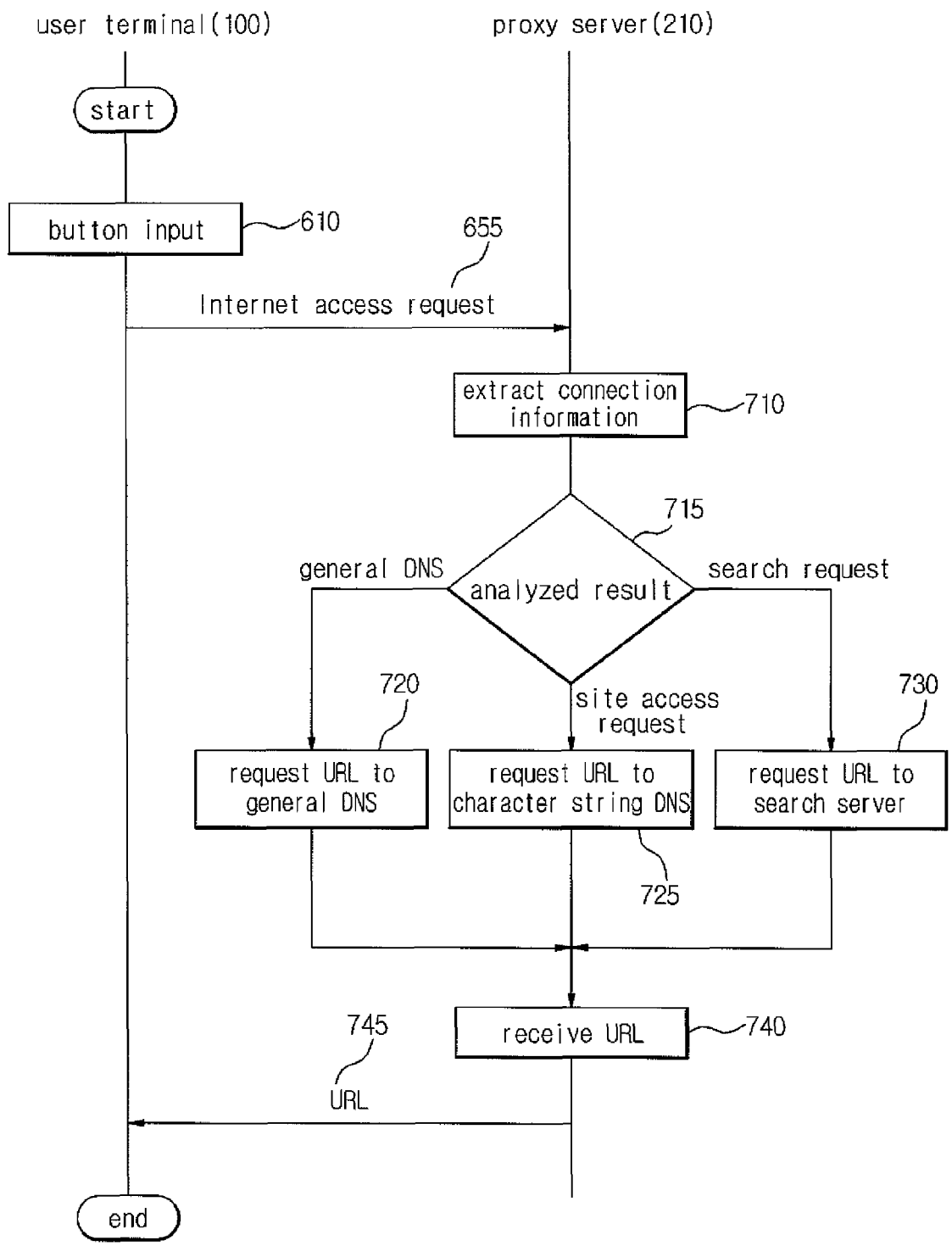
FIG. 7 is a flowchart of a process for wireless Interne access by using character string according to one embodiment of the present invention.
Figure 8:
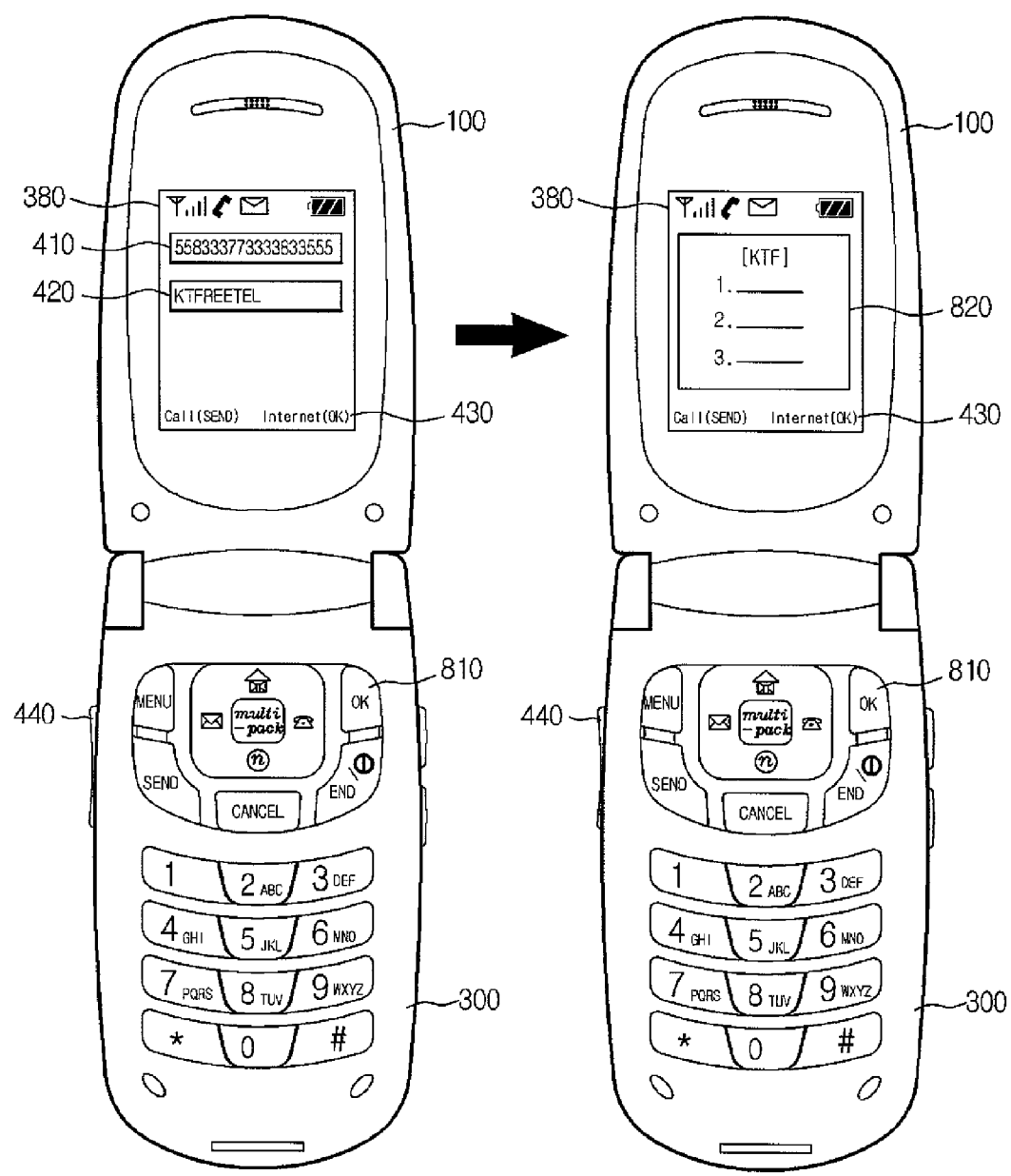
FIG. 8 to 10 shows a user interface screen according to one embodiment of the present invention.
Figure 9:
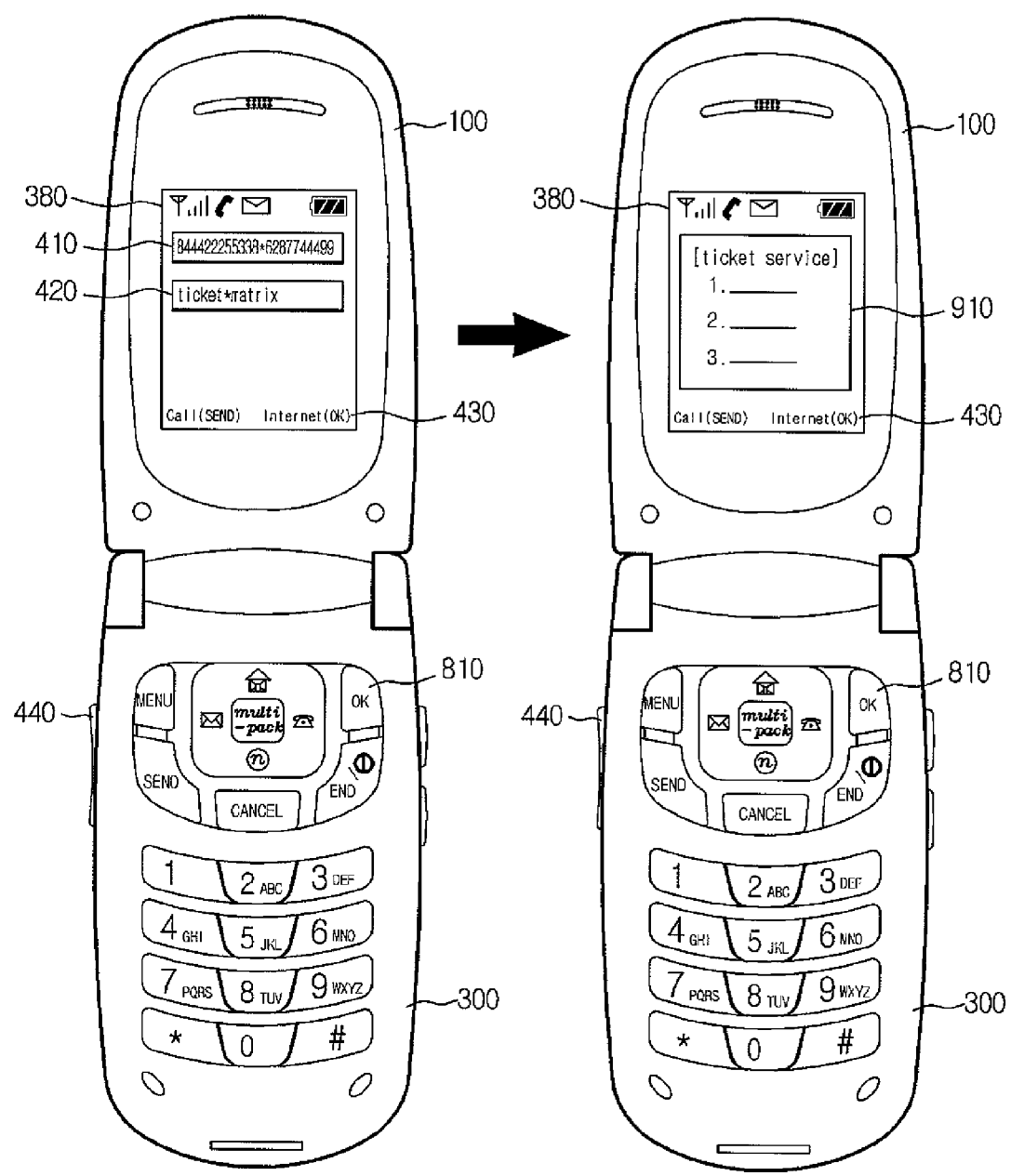
Figure 10:
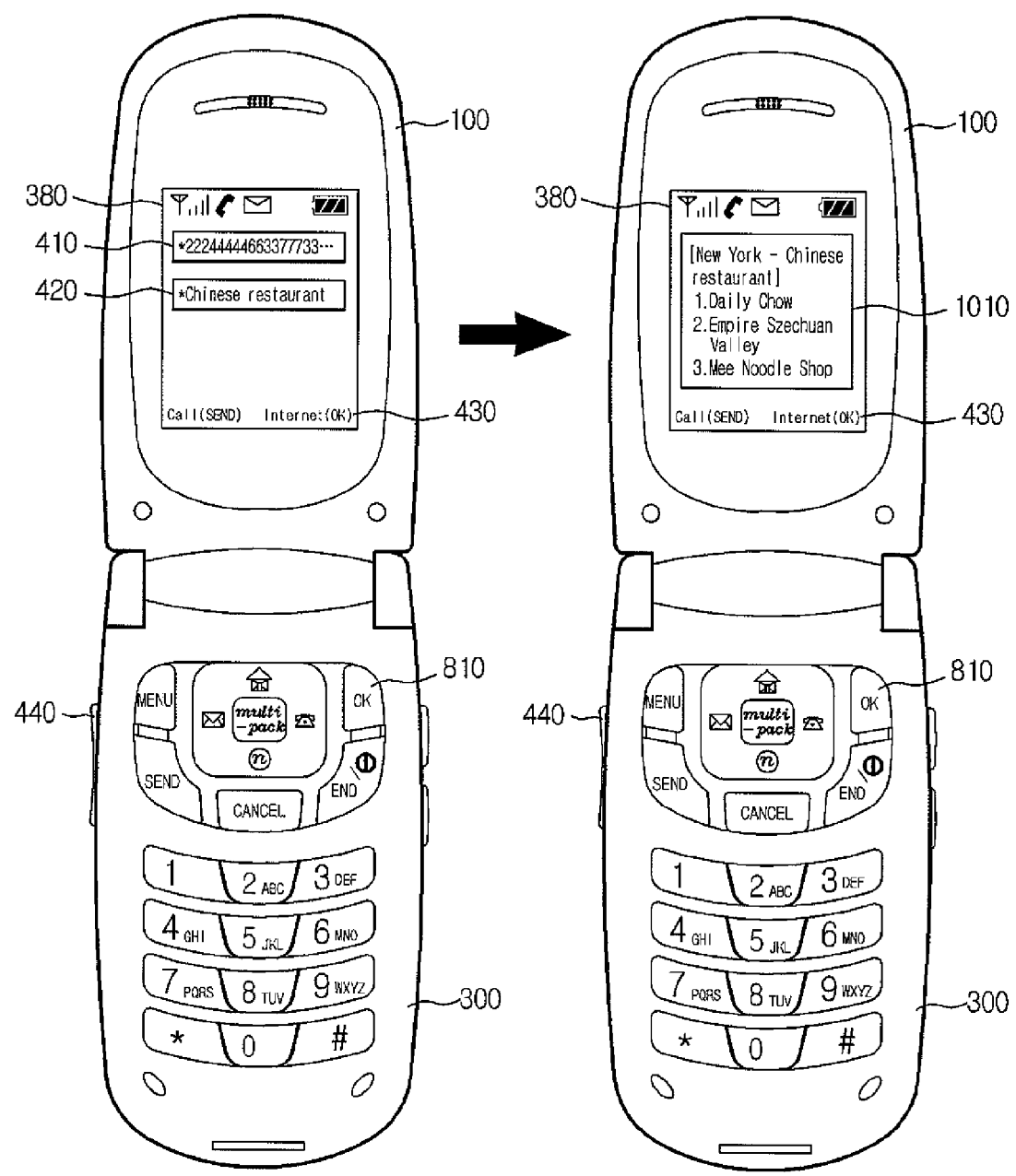

FIG. 7 is a flowchart of process for wireless Internet access by using character string according to one embodiment of the present invention, and FIGS. 8 to 10 show user interface screen according to one embodiment of the present invention.

FIG. 7 shows data transmission process between the user terminal 100 and the proxy server 210 for providing service. Referring to FIG. 7, the user terminal 100 receives an input of a certain button from the user at step 610, and transfers the Internet access request including the character string to the proxy server 210 via wireless network at step 655. Since step 610 through 655 are already described in FIG. 6, same description will be omitted.

The proxy server 210 extracts connection information (i.e., character string and/or separator) from the Internet access request signal at step 710, and analyzes connection information according to the predetermined method at step 715. If connection information is conventional domain name, the proxy server 210 requests URL to the general DNS server 230 at step 720. Also, if connection information is the site access request signal having the predetermined structure, the proxy server 210 requests URL to the character string DNS server 220 to receive URL matched to the character string at step 725. Also, if connection information is the search list request signal having the predetermined structure, the proxy server 210 requests URL to the character search server 240 to receive URL matched to the character string at step 730.

The proxy server 210 receives URL from the general DNS server 230, the character string DNS server 220, or the search server 240 at step 740, and transfers the URL to the user terminal 100. In case of transferring URL only, the user terminal 100 requests an access to the corresponding information server 120 by using the received URL, and when receiving a connection response signal from the information server 120, the connection between the user terminal 100 and the information server 120 is established. Also, as described above, it is also possible for the proxy server 210 to transfer a web page corresponding to the URL to the user terminal 100.

Hereinafter, the process of Internet service access apparatus 155 for providing URL (i.e., URL, or web page corresponding to the URL) according to the Internet access request from the user terminal 100 will be described in detail. As described above, the Internet access request may comprise connection information corresponding to one of the site access request signal (FIG. 8), the search list request signal (FIG. 9), and the step-by-step execution request signal (FIG. 10), and connection information may consist at least one of character string, separator, and identifier.

When the Internet service access apparatus 155 receives the Internet access request from the user terminal 100, the proxy server 210 extracts connection information from the Internet access request. And, by using the structure of connection information, the proxy server 210 determines if connection information corresponds to site access request signal, search list request signal, or step-by-step execution request signal.

If connection information is the site access request signal or step-by-step execution request signal, the proxy server 210 transfers connection information to the character string DNS server 220 for requesting URL. The character string DNS server 220 extracts URL corresponding to connection information and transfers the extracted URL to the proxy server 210. Instead of URL, the character string DNS server 220 can transfer to the proxy server 210 the web page that the information server 120 provides. The proxy server 210 transfers to the user terminal 100 the URL or the web page from the character string DNS server 220, or the web page corresponding to the URL from the search server 240.

FIG. 8 is a screen display for showing access result corresponding to the site access request signal. Referring to FIG. 8, the user terminal 100 comprises various buttons (i.e., numeric button, function button, etc), and displays information corresponding to each numeric button that the user pushes on the number string display region 410 and the character string display region 420, respectively. If the user pushes "OK" button 810 character string when "KTFreetel" is displayed on the character string display region 420, the user terminal 100 generates transmission format data including the character string being displayed on the character string display region 420 and transfers it to the mobile communication system 110. The proxy server 210 of the mobile communication system 110 acquires the URL corresponding to the character string by using character string DNS server 220 and sends a request for connection to the corresponding information server 120 by using the URL so that the connection between the user terminal 100 and the information server 120 can be established. As a result, the display 380 of user terminal 100 displays the web page 9935 from the information server 120. Of course, as described above, the proxy server 210 can transfer the URL only to the user terminal 100, and the user terminal 100 tries to access to the information server 120 corresponding to the URL.

But, in case that connection information is the search list request signal or the step-by-step execution request signal and the proxy server 210 fails to acquire the corresponding URL from the character string DNS server 220, the proxy server 210 transfers to the character string DNS server 220 URL request of site that provides service correspond to the service type (e.g., reservation, search, news, stock, ticket, actor/actress, game, etc). The proxy server 210 receives URL from the character string DNS server 220, and transfers the received URL and keyword (e.g., if connection information is "ticket*matrix" or "*Chinese restaurant", "island" or "Chinese restaurant" is keyword) to the search server 240. The search server 240 generates the search list by using the information server 120 corresponding to the URL and keyword, and transfers the generated search list to the user terminal 100.

FIG. 9 is a screen display for showing access result corresponding to the search list request signal. Referring to FIG. 9, the user terminal 100 displays information corresponding to each numeric button that the user pushes on the number string display region 410 and the character string display region 420, respectively. If the user pushes "OK" button 810 character string when "ticket*Matrix" is displayed on the character string display region 420, the user terminal 100 generates transmission format data including the character string being displayed on the character string display region 420 and transfers it to the mobile communication system 110. The proxy server 210 of the mobile communication system 110 acquires the URL corresponding to the service type by using character string DNS server 220 and sends the URL and keyword (i.e., Matrix) to the search server 240 to generate the search list of web sites that sell ticket for Matrix. Then, the proxy server 210 transfers the search list to the user terminal 100.

FIG. 10 is a screen display for showing access result corresponding to the step-by-step execution request signal. Referring to FIG. 10, the user terminal 100 displays information corresponding to each numeric button that the user pushes on the number string display region 410 and the character string display region 420, respectively. If the user pushes "OK" button 810 character string when "*Chinese restaurant" is displayed on the character string display region 420, the user terminal 100 generates transmission format data including the character string being displayed on the character string display region 420 and transfers it to the mobile communication system 110. The proxy server 210 of the mobile communication system 110 requests the URL corresponding to the character string to the character string DNS server 220, and if there is no corresponding URL, requests the URL of search server to the character string DNS server 220. On receiving URL from the character string DNS server 220, the proxy server transfers the received URL and keyword (i.e., Chinese restaurant) to the search server 240 to generate the search list. Then, the proxy server 210 transfers the search list to the user terminal.

Figure 11:
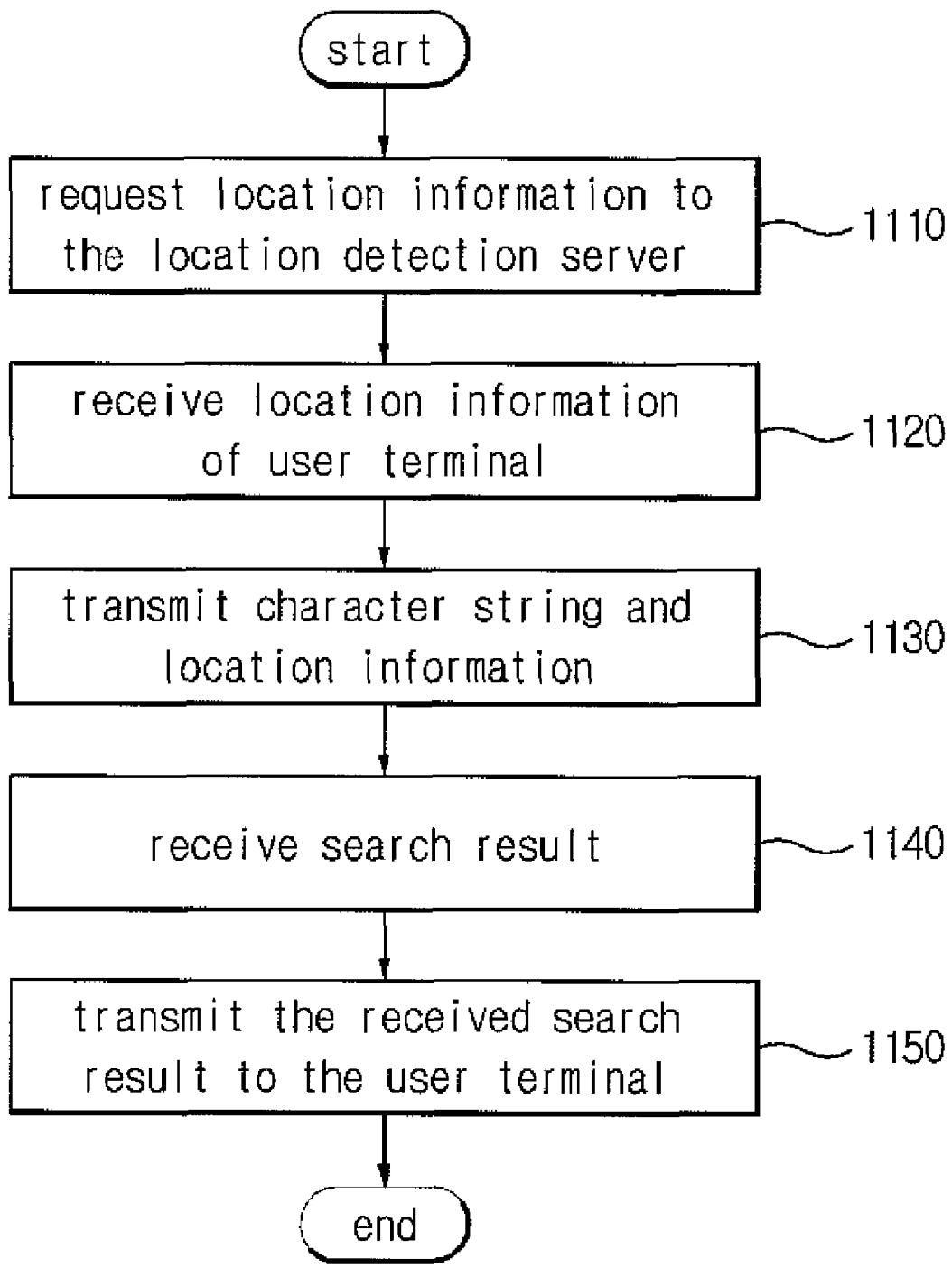
FIG. 11 is a flowchart for providing LBS according to one embodiment of the present invention.

FIG. 11 is a flowchart for providing LBS according to one embodiment of the present invention.

In providing Internet access service according to one embodiment of the present invention, it is possible to provide search list efficiently by using the predetermined service type and keyword. Especially, if the service type is location-based service, the proxy server 210 can provide URL associated only with location information of the user terminal 100. Also, even without inputting location information, it is possible to acquire location information by using location detection method, and it is possible for the proxy server 210 to transfer connection information associated with location information to the character string DNS server 220 or the search server 240.

The proxy server 210 of the Internet service access apparatus 155 requests location information of the user terminal 100 to the location detection server at step 1110.

The proxy server 210 receives location information of the user terminal from the location detection server. The location detection server, which is connected to MSC 145 for storing the location of user terminal, is one of HLR (Home Location Register), VLR (Visitor Location Register) and so on. These location detection servers, which store BTS identifier that the user terminal sends as location of the mobile terminal, transfer location information of the mobile terminal to the Internet service access apparatus 155. And, it is also possible to provide location information through conventional method such as GPS or power measurement.

The proxy server 210 transfers connection information from the user terminal 100 and location information from the location detection server to the character string DNS server 220 and/or search server 240 at step 1130. The character string DNS server 220 and/or the search server 240 extracts URL associated with connection information and location information, and transfers the extracted URL as a search result to the proxy server 210 at step 1140.

The proxy server 210 transfers the search result from the character string server 220 or the search server 240 to the user terminal at step 1150.

In at least one embodiment, the method and system for providing the selected service by dual input of number string and character string display number and character, both assigned to one numeric button, at the same time and allow the user to select one of a number string and a character string by pushing a function button corresponding to the number string or the character string so that user convenience is improved.

At least one embodiment recognizes URL or service type of the desired site by using the transmitted character string so that access to information is rapidly accomplished.

At least one embodiment eliminates the need to learn how to use the service.

Furthermore, at least one embodiment induces the user to access wireless Internet through the easier wireless Internet access method and revitalizes wireless Internet service and electronic commerce through frequent accesses to wireless Internet.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

What is claimed is:

1. A method of providing an Internet access service, comprising:
  (a) receiving, at a user terminal, an input signal for a numeric button, wherein the numeric button corresponds to a number and a character, wherein the user terminal is a mobile terminal or a personal digital assistant (PDA);

(b) recognizing the input signal as a number and a character corresponding to the number;

(c) displaying the number and the character on a number string display region and a character string display region of the user terminal, respectively, wherein the number and character string display regions have different respective locations on the user terminal;

repeating (a) through (c) until there is any input signal for a function button;

on receiving the input signal for the function button, determining when the function button is associated with the number string display region or the character string display region; and when the function button is associated with the character string display region, transmitting an Internet access request including a character string displayed on the character string display region to an Internet service access apparatus, wherein the character string comprises a plurality of characters, wherein the user terminal supports a plurality of languages, and wherein the method further comprises:

performing a spelling check on the character string;

when there is an incorrect spelling in the character string, converting the language of the character string into one of the languages that the user terminal supports;

generating the Internet access request including the converted character string; and transmitting the Internet access request to the Internet service access apparatus.

2. The method of claim 1, further comprising transmitting a voice call request including a number string displayed on the number string display region to a mobile communication system when the function button is associated with the number string display region, wherein the number string comprises a plurality of numbers.

3. The method of claim 1, wherein the character string display region comprises N(>=2) sub-regions configured to display characters of plural languages, respectively, and wherein the sub-regions are associated with plural function buttons, respectively.

4. The method of claim 1, further comprising:

receiving an input signal for a language conversion button;

on receiving the input signal for the language conversion button, converting the language of the character string on the character string display region from a first language into a second language; and displaying the character string in the second language on the character string display region.

5. The method of claim 1, wherein when the character string in the Internet access request comprises more than one character, the Internet service access apparatus transmits one of a domain address corresponding to the character string and a web page corresponding to the domain address to the user terminal.

6. The method of claim 1, wherein if when the character string in the Internet access request comprises a service type and a keyword that are distinguished by a predetermined separator, the Internet service access apparatus transmits to the user terminal a search list that is generated by using the service type and the keyword.

7. A method of providing an Internet access service, comprising:

receiving, at an Internet service access apparatus, an Internet access request including a character string from a user terminal, wherein the user terminal is a mobile terminal or a personal digital assistant (PDA), wherein the character string comprises a plurality of characters, wherein the user terminal displays i) a number string comprising a plurality of numbers and ii) the character string, corresponding to numeric buttons which the user enters, on a number string display region and a character string display region of the user terminal, respectively, and when a function button associated with the character string display region is entered, the user terminal transmits the Internet access request including the character string displayed on the character string display region to the Internet service access apparatus, wherein the user terminal supports a plurality of languages, and wherein the user terminal i) performs a spelling check on the character string, ii) when there is an incorrect spelling in the character string, converts the language of the character string into one of the languages that the user terminal supports, iii) generates the Internet access request including the converted character string and iv) transmits the Internet access request to the Internet service access apparatus;

obtaining the character string from the Internet access request;

determining whether or not the obtained character string comprises more than one character;

when the character string comprises more than one character, transmitting a uniform resource locator (URL) request including the character string to a character string domain name system (DNS) server and receiving a URL corresponding to the character string from the character string DNS server; and transmitting the URL corresponding to the character string to the user terminal.

8. The method of claim 7, further comprising:

when the character string in the Internet access request comprises a service type and a keyword that are distinguished by a predetermined separator, transmitting the URL request corresponding to the service type to the character string DNS server and receiving the URL corresponding to the service type from the character string DNS server;

transmitting a search list generation request including the URL and the keyword to a search server and receiving a search list that is generated by using search result from more than one information server corresponding to the URL; and transmitting the search list to the user terminal.

9. The method of claim 8, further comprising:

receiving location information of the user terminal from one of the user terminal and a location detection server; and transmitting the location information to one of the character string DNS server and the search server, wherein the character string DNS server transmits a URL associated only with the location information or the search server generates the search list by using the search result associated only with the location information.

10. The method of claim 7, wherein the character string DNS server obtains the character string from the URL request, and obtains the URL corresponding to the character string by comparing previously stored character strings with previously stored URLs.

11. The method of claim 7, wherein the URL transmitted to the user terminal is included in a web page corresponding to the URL.

12. A user terminal for providing an Internet access service, comprising:
   a display section;
   a keypad comprising a plurality of numeric buttons and a plurality of function buttons, wherein each numeric button corresponds to a number and a character;
   a button recognition processor configured to recognize numbers and characters that are associated with the numeric buttons, wherein the numbers form a number string and the characters form a character string;
   a display controller configured to display the number string and the character string on a number string display region and a character string display region, respectively, wherein both regions are independent from each other;
   a signal generator configured to determine when the function button is associated with the character string display region when the function button is entered, and generate an Internet access request including the character string on the character string display region when the inputted function button is associated with the character string display region; and
   a transceiver configured to transmit the Internet access request to an Internet service access apparatus,
   wherein the user terminal supports a plurality of languages, wherein the user terminal is a mobile terminal or a personal digital assistant (PDA), and wherein the user terminal is further configured to i) perform a spelling check on the character string, ii) when there is an incorrect spelling in the character string, convert the language of the character string into one of the languages that the user terminal supports, iii) generate the Internet access request including the converted character string and iv) transmit the Internet access request to the Internet service access apparatus.

13. The user terminal of claim 12, further comprising:
   a language conversion button configured to generate a conversion signal; and
   an input character string converter configured to convert a first language of the character string on the character string display region into a second language when receiving the conversion signal.

14. An Internet service access system for providing an Internet access service, comprising:
   a proxy server configured to i) receive an Internet access request including a character string, comprising a plurality of characters, from a user terminal, wherein the user terminal is a mobile terminal or a personal digital assistant (PDA), ii) obtain the character string from the Internet access request, iii) transmit a uniform resource locator (URL) corresponding to the character string to the user terminal, wherein the user terminal is configured to display 1) a number string comprising a plurality of numbers and 2) the character string, corresponding to numeric buttons that the user enters, on a number string display region and a character string display region of the user terminal, respectively, and
   when a function button corresponding to the character string display region is entered, the user terminal is further configured to transmit the Internet access request including the character string displayed on the character string display region to an Internet service access apparatus, wherein the user terminal supports a plurality of languages, and wherein the user terminal is further configured to i) perform a spelling check on the character string, ii) when there is an incorrect spelling in the character string, convert the language of the character string into one of the languages that the user terminal supports, iii) generate the Internet access request including the converted character string and iv) transmit the Internet access request to the Internet service access apparatus; and
   a character string domain name system (DNS) server, being in data communication with the proxy server through a communication network, configured to provide a URL corresponding to the character string by comparing previously stored character strings with previously stored URLs.

15. The Internet service access system of claim 14, wherein when the character string comprises a service type and a keyword that are distinguished by a predetermined separator,
   wherein the proxy server is further configured to i) transmit an URL request corresponding to the service type to the character string DNS server, ii) receive the URL corresponding to the service type from the character string DNS server, iii) transmit a search list generation request including the URL and the keyword to a search server, iv) receive a search list that is generated by using search result from more than one information server corresponding to the URL, and v) transmit the search list to the user terminal.

16. A non-transitory computer readable medium storing instructions which when executed cause a processor to perform a method of providing an Internet access service, the method comprising:
   (a) receiving, at a user terminal, an input signal for a numeric button, wherein the numeric button corresponds to a number and a character, wherein the user terminal is a mobile terminal or a personal digital assistant (PDA);
   (b) recognizing the input signal as a number and a character corresponding to the number;
   (c) displaying the number and the character on a number string display region and a character string display region of the user terminal, respectively, wherein the number and character string display regions are different in location from each other;
   repeating (a) through (c) until there is any input signal for a function button;
   on receiving the input signal for the function button, determining when the function button is associated with the number string display region or the character string display region; and
   when the function button is associated with the character string display region, transmitting an Internet access request including a character string being displayed on the character string display region to an Internet service access apparatus, wherein the character string comprises a plurality of characters,
   wherein the user terminal supports a plurality of languages, and wherein the method further comprises:
   performing a spelling check on the character string;
   when there is an incorrect spelling in the character string, converting the language of the character string into one of the languages that the user terminal supports;
   generating the Internet access request including the converted character string; and
   transmitting the Internet access request to the Internet service access apparatus.

17. A method of providing an Internet access service, comprising:

a) receiving, at a mobile terminal, a plurality of key inputs each of which is associated with a number and at least one character, wherein the mobile terminal comprises a first display region and a second display region which have different respective locations on the mobile terminal;

b) recognizing the key inputs as numbers and corresponding characters, wherein the numbers form a number string and the characters form a character string, and wherein the mobile terminal is configured to provide the Internet access service based on the character string; and c) displaying the number string and the character string on the first and second display regions, respectively, receiving a function key, wherein the function key is configured to call at a phone number corresponding to the number string or send an Internet service request based on the character string;

determining when the function key is associated with the first display region or the second display region;

when the function key is associated with the first display region, performing a phone call at the phone number; and when the function key is associated with the second display region, transmitting the Internet access request to an Internet service access apparatus, wherein the mobile terminal supports a plurality of languages, and wherein the method further comprises:

performing a spelling check on the character string;

when there is an incorrect spelling in the character string, converting the language of the character string into one of the languages that the mobile terminal supports;

generating an Internet access request including the converted character string; and transmitting the Internet access request to an Internet service access apparatus.

18. An Internet service access apparatus for providing an Internet access service, comprising:

means for receiving, at a mobile terminal, a plurality of key inputs each of which is associated with a number and at least one character, wherein the mobile terminal comprises a first display region and a second display region, which have different respective locations on the mobile terminal;

means for recognizing the key inputs as numbers and corresponding characters, wherein the numbers form a number string and the characters form a character string, and wherein the mobile terminal is configured to provide the Internet access service based on the character string; and means for displaying the number string and the character string on the first and second display regions, respectively, mean for receiving a function key, wherein the function key is configured to call at a phone number corresponding to the number string or send an Internet service request based on the character string;

mean for determining when the function key is associated with region or the second display region;

mean for, when the function key is associated with the first display region, performing a phone call at the phone number; and mean for, the function key is associated with the second display region, transmitting the Internet access request to an Internet service access apparatus, wherein the mobile terminal supports a plurality of languages, and wherein the apparatus further comprises:

means for performing a spelling check on the character string;

means for converting the language of the character string into one of the languages that the mobile terminal supports, when there is an incorrect spelling in the character string;

means for generating an Internet access request including the converted character string; and means for transmitting the Internet access request to an Internet service access apparatus.

\* \* \* \* \*